T. B. MUNROE.
THERMO INSULATION MATERIAL AND PROCESS OF PRODUCING THE SAME.
APPLICATION FILED APR. 3, 1919.

1,335,909.

Patented Apr. 6, 1920.
2 SHEETS—SHEET 1.

Inventor
T. B. Munroe, by
T. A. Witherspoon
Attorney

T. B. MUNROE.
THERMO INSULATION MATERIAL AND PROCESS OF PRODUCING THE SAME.
APPLICATION FILED APR. 3, 1919.

1,335,909.

Patented Apr. 6, 1920.
2 SHEETS—SHEET 2.

Witness

Inventor
T. B. Munroe, by
T. G. Witherspoon
Attorney

UNITED STATES PATENT OFFICE.

TREADWAY B. MUNROE, OF FOREST GLEN, MARYLAND, ASSIGNOR TO B. G. DAHLBERG, OF ST. PAUL, MINNESOTA.

THERMO-INSULATION MATERIAL AND PROCESS OF PRODUCING THE SAME.

1,335,909.     Specification of Letters Patent.     Patented Apr. 6, 1920.

Application filed April 3, 1919. Serial No. 287,138.

*To all whom it may concern:*

Be it known that I, TREADWAY B. MUNROE, a citizen of the United States, residing at Forest Glen, in the county of Montgomery and State of Maryland, have invented certain new and useful Improvements in Thermo-Insulation Material and Processes of Producing the Same; and I do hereby declare the following to be a full, clear, and exact description of the invention, such as will enable others skilled in the art to which it appertains to make and use the same.

This invention relates to block thermo insulation material and process of producing the same, and has for its object to provide such a process and product which will be less costly and more efficient than those heretofore proposed.

With these and other objects in view the invention consists in the novel steps and combinations of steps constituting the process, and in the novel product resulting therefrom, all as will be more fully hereinafter disclosed and particularly pointed out in the claims.

Referring to the accompanying drawings, forming a part of this specification, in which like numerals designate like parts in all the views.

Figure 1:
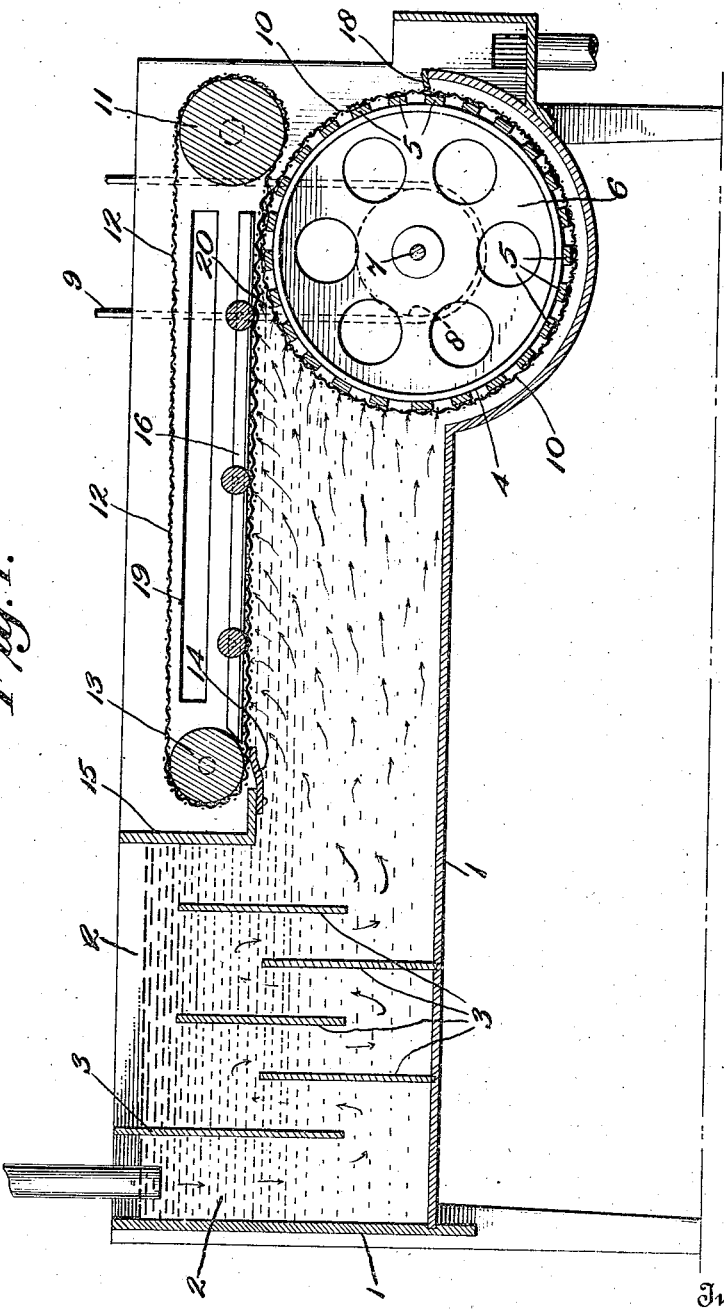
Figure 1 is a diagrammatic sectional view of a machine suitable for carrying out the present process.

In order that the precise nature of the invention may be the more clearly understood it is said:—

In the proper preservation of food in cold storage, and in refrigerating cars, it is of prime importance to exclude, as far as possible, heat transmission from the outside. For if it is possible to exclude the majority of the heat transmitted from the outside, the only work the refrigerating plant has to do is to chill the food stored in it, to the desired temperature, and then maintain said temperature; whereas, if the insulation used is deficient, so that heat is transmitted from the outside, the refrigerating equipment has to overcome this continuously.

There have been heretofore proposed, and there are on the market today many forms of thermo insulation material for cold storage use. These vary in thickness from one inch to five inches or over, and are manufactured in blocks, either one foot by three feet, by the desired thickness, or eighteen inches square in the desired thickness. The most widely used insulations today are pure cork, (which sells at about 28 cents a square foot, surface measure, in the two inch thickness); impregnated cork, (which sells for about 21 cents, for the same size); mineral wools of the better grade, (which sell at about 18 cents); cheap mineral wool; and lith, (which is a flax material, and which is sold at about 14 cents.)

While cork is eminently suited for the purpose, the expense of using it as an insulation is very heavy, but on the other hand, the mineral wools and lith are fragile, and hard to handle. It is therefore the purpose of this invention to overcome these difficulties, and to produce an insulation that is water resisting, very efficient, and nominal in price.

It is well recognized that blocks composed of wood pulp fibers form an excellent substitute for cork for insulating purposes, and various kinds of wood pulp materials have been proposed, but all of those with which I am familiar are composed of comparatively short, fine fibers similar to those used in the manufacture of paper, or pulp board, compressed into a more or less homogeneous mass. Further, although it has likewise been proposed to waterproof these materials it has not been found practical commercially to do so when the thickness exceeds say one or one and a quarter inches, for the reason that as the outside surfaces dry first they become waterproof and it is then impossible to get the remaining water out of the interior portions of the block.

On the other hand, in the present invention I propose to use, not only the comparatively short, fine fibers, which will produce a smooth, finished surface, but also long, hair like fibers, say from one to two inches in length, to form a binder, and also comparatively thick slivers to give porosity and lightness to the finished product. In addition, I may add such other classes of fibers as may be found desirable for special purposes.

These said three or more kinds of fibers are thoroughly mixed with water in say the proportion of from less than one to five parts of fiber to from more than ninety-nine to ninety-five parts of water, so that each individual fiber is completely suspended in the water, whereupon the mixture or solution is passed through a felting machine which felts or knits all of the fibers together into sheets possessing the desired properties and of from one quarter to one inch in thickness, as may be desired. The fibers may be treated while in solution with a suitable waterproofing material, which owing to the exceedingly high dilution, thoroughly impregnates and coats each individual fiber.

As the sheets come from the felting machine, they contain from 50% to 75% of water, but they may be completely dried by passing them through a drier having a temperature of not over 350° F., and in which the air is maintained in a moist condition so that the sheet dries progressively from the interior outward. The time of passage of the sheet through the drier is regulated in conjunction with the temperature so that the sheets issue from the drier containing less than 10% moisture, but without being burned or discolored by too high a temperature.

As above stated, it has been found commercially practical by this method to produce blocks or sheets of say one inch in thickness which are thoroughly dried, possess great structural strength, a good surface, and which are waterproof, and in order to secure blocks of from say two to six inches or more in thickness, I propose to bind together a plurality of the thinner sheets or blocks, as by the use of staples, stitching, asphalt or other suitable binder. In this way blocks of any desired thickness may be built up which will not only have a high degree of porosity, and low specific gravity, but which will be thoroughly waterproof, possess great structural strength and have a good surface. If desired such surface may be specially treated by sanding, or may be given special coats of plaster and asphalt, etc.

In carrying out the invention, as above outlined, use may be made of an apparatus similar to that shown diagrammatically in Fig. 1, in which 1 indicates a suitable tank adapted to receive the pulp solution, which, as above stated, preferably consists of from less than one to five parts of cellulose fiber, to more than ninety nine to ninety five parts of water. The said solution or mixture of water and fibers is fed into the well 2 with which the said tank is provided, and flows from left to right as seen in the said Fig. 1, around the baffles 3 which assist in agitating the stock and in securing a perfect suspension of each individual fiber, which forms a very important feature of this invention. 4 indicates a drum or roller mounted in the tank 1, as shown and preferably formed of slats or strips 5, suitably spaced apart around the periphery of the pair of hubs 6, which are mounted on the shaft 7, and which may be driven as by the pulley 8 and belt 9.

The said drum 4 is covered with one or more layers of foraminous material 10, such for example, as wire cloth of from say 10 to 14 mesh, and associated therewith is a top roller 11 around which passes an endless foraminous belt or screen 12, which likewise passes around the front roller 13 as shown.

14 designates a flexible seal of leather, rubber or other suitable material, secured to the wall 15 of the tank 1, and bearing against the under surface of the belt 12, thereby preventing the stock from passing up around the roller 11 except through the said belt. The edges of the said belt 12 travel under the angle irons 16 which likewise form seals therefor, while 18 indicates a seal similar to 14 for the drum 4.

In operation, paper mill waste or "tailings" which consist of slivers and waste from a ground wood mill that are too large to go into paper, with the addition of the knots and large slivers from a sulfite or other mill, is first ground down with a relatively small amount of water to the desired size of fiber. Any or all of these wastes may be used. As above stated, it is found essential to have a mixture of fibers; 1st, a very small fiber as filler; 2nd, a long hairlike fiber as a binder; and 3rd, a coarse fiber to give porosity to the board. After the material is of a desired size and consistency, a proportion of ordinary rosin size not exceeding say 10% is run in and the material is thoroughly mixed. Aluminum sulfate is then run in and thoroughly mixed also, which precipitates free rosin and aluminum resinate on each individual fiber. The material is then introduced into the felting machine, where it is mixed with water to approximately the proportions above given, and felted into sheets, of from one quarter of an inch or less to one and one-half inches in thickness, and of suitable surface dimensions.

Owing to the great amount of water used in proportion to the fiber, the velocity of the stock through the machine is quite high. For example, in an apparatus producing say 10,000 linear feet of one half inch board four feet wide per twenty-four hours, there is passing through the machine each minute from ten to twenty pounds of fiber and from 175 to 250 gallons of water. It results from this said relatively high velocity that the individually suspended fibers are for the most part carried along endwise, after the manner of a stick floating down a rapidly moving stream; and when they strike the foraminous covering 10 of the drum 14, or the endless screen 12, the majority of them will stand out more or less at right angles thereto. Other fibers, however, are immediately deposited beside them, and on top of them, and the pressure of the stock behind them, together with the movement of the screens, serves to thoroughly interweave and entangle the various fibers into a porous spongy mass.

The fibers collected upon the drum 4 are brought into contact with those deposited on the traveling screen 12, as at 20, where they are joined by other fibers from the stock into a single sheet of any desired thickness. Some pressure is applied at the point 20 by the roll 11, which serves to expel some of the water, but the sheet leaves the machine containing more than 40% and approximately 50% to 85% of water, which must be removed in the drying process. This relatively very high percentage of water is secured by avoiding a pressure high enough to squeeze it out so that when said water is eliminated through the drying process air takes its place and a very high porosity of the product is secured.

The thickness of the board or sheet made may be varied by the speed of the drum 4 and the surface 12, by the pressure exerted at point 20, by roll 11, or by the dilution of the stock, or by all of these, but in every case the product is much more porous than is the well known commercial paper boards now on the market, owing to the very high percentage of water carried by the original wet mass and later eliminated through the drying process.

The drying may be carried out in any suitable form of apparatus, but as above explained, the air therein should be maintained in a moist condition so that the sheet will dry progressively from the inside outwardly. The time of its passage through the drier and the temperature maintained must be regulated so that the sheet will issue from the dry kiln perfectly dry, but will not be charred.

The temperature is preferably maintained at from 250° F. to 350° F. and the drying should be continued until the moisture content is not more than say 5% in order to maintain a high porosity while securing the best water proofing results, for it is believed that the free rosin and aluminum resinate do not become attached to the fibers so long as they are moist but only as said fibers become dry.

It is also thought that these waterproofing materials fuse somewhat as the fibers become dried, and thereby coat them more completely. This is borne out by the fact that if the sheets come from the drier containing more than 10% of moisture they are not waterproof, whereas if the same sheets are redried so as to contain not more than say 5% of moisture, they are waterproof. It will be observed that the stock level in the well 2 is somewhat higher than it is in the right hand end of the apparatus. This, in conjunction with the seals 14, 16, and 18 produces a constant pressure against the foraminous covering 10 of the drum 4, and against the under side of the endless screen 12, which has been found to aid materially in the felting action.

Figure 2:
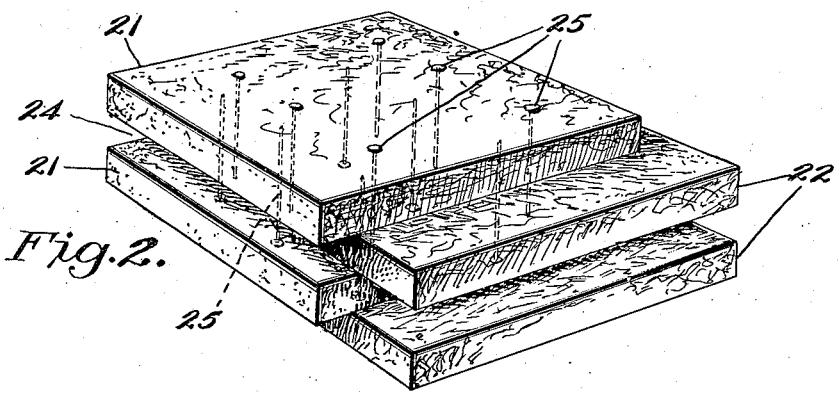
Fig. 2 is a perspective view of one form of block made in accordance with this invention.
Figure 3:
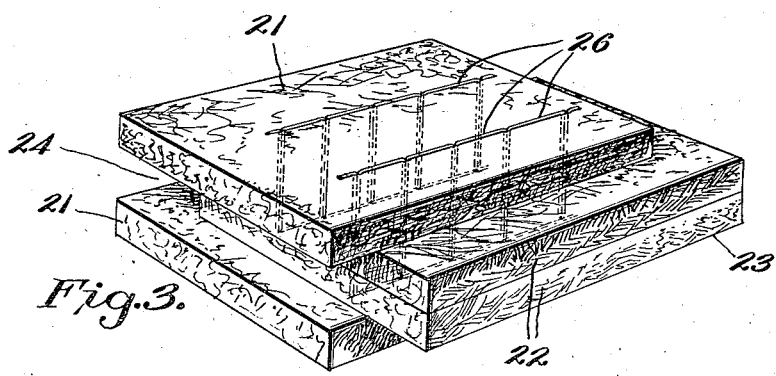
Figs. 3 and 4 are perspective views of slightly modified forms of block.
Figure 4:
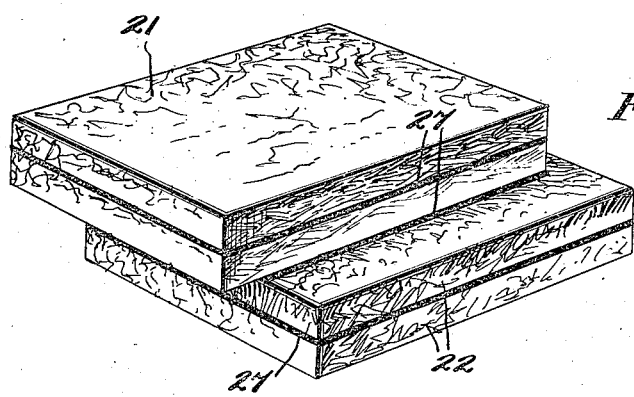

In the placing of blocks or sheets in cold storage or refrigerating plants, it is very desirable to break the joints between individual blocks so as to prevent or minimize leakage. The laminated form of block here proposed is particularly adapted to this, for if the sheets are overlapped or offset as illustrated in Figs. 2, 3, and 4, the various kinds of broken joints may be produced. For example, by securing the sheet 21 with its edges offset from those of the sheets 22, as shown in Fig. 3 a tongue 23 and a groove 24 is provided which when associated with similarly offset edges of a companion block form a joint which is not only efficient in preventing leakage of heat, but also lends itself readily to the application of the blocks.

In Fig. 2 a double tongue and groove is shown while in Fig. 4, the slabs are offset to form a lap joint. Figs. 2, 3 and 4 likewise illustrate various methods of securing the slabs together. In Fig. 2 for example, they are shown as fastened together by means of nails, or brads, 25, and in Fig. 3 by means of thread, wire or other stitching 26, while in Fig. 4, I have illustrated the use of asphalt or other binder 27. Of course, if a broken joint is not essential the slabs may be stacked with their edges even and suitably secured.

Should a fireproof material be desired, the stock or the finished boards may be treated in any suitable manner to produce such a result. I prefer however in this case to treat the material with a substance which is substantially insoluble in water, but which under the influence of moderate temperature, say 150° C. to 500° C. will break down into its constituent parts, either solid, liquid or gaseous, one or more of which will not support combustion. Or with a substance which under the influence of heat will give off an inert gas incapable of supporting combustion.

For example, fiber thoroughly impregnated with ferrous oxalate $FeC_2O_4.2H_2O$ is found to be substantially fireproof. The said ferrous oxalate, when raised to a temperature of approximately 160° C. decomposes into two molecules of water, one molecule of carbon dioxid $CO_2$, one molecule of carbon monoxid CO and one atom of iron. Of these only the carbon monoxid will support combustion, but this is overcome by the preponderance of other gases, liquids and solids produced which will not support combustion.

Further, if desired, instead of applying the fireproofing material directly to the fiber it may be formed thereon by the reaction of two or more substances capable of producing it. For instance, instead of applying the ferrous oxalate directly, ferrous sulfate which is water soluble may be mixed with the fiber stock, which is then treated with oxalic acid to form the insoluble ferrous oxalate.

It will of course be apparent that the board may be produced without either the waterproofing or fireproofing; it may be produced with the waterproofing alone, or with the fireproofing alone; or it may be produced with both the waterproofing and fireproofing all according to the use which is to be made of it.

It is obvious that those skilled in the art may vary the details of construction as well as the procedure for producing the insulation material, and therefore, I do not wish to be limited to the above disclosure except as may be required by the claims.

What I claim is:—

1. The process of producing waterproof heat insulating blocks of fibrous material which consists in providing a solution of cellulose fibers; said fibers composed of coarse sliverlike portions to give porosity to the mass, of long hair like portions to act as a binder, and of short hair like portions to act as a filler; mixing with said solution a waterproofing material; felting said fibers into sheets containing more than 40% of water; removing substantially all of the moisture from said sheets; and securing a plurality of said sheets together to form a block, substantially as described.

2. The process of producing waterproof heat insulating blocks of fibrous material which consists in providing a solution of cellulose fibers and water; treating said solution with a waterproofing material to coat said fibers; felting said fibers into relatively thin sheets; heating said sheets in a moist atmosphere whereby they are dried progressively from the interior outwardly; and fastening a plurality of said sheets together to form a block, substantially as described.

3. The process of producing waterproof heat-insulating blocks of relatively great thickness which consists in providing a solution of wood fibers and water, in substantially the proportions of up to five parts of fiber to ninety five or more parts of water; treating said solution with a waterproofing material adapted to coat said fibers; felting said fibers into relatively thin sheets; subjecting said sheets to a temperature not exceeding 350° F. in the presence of moisture whereby they are dried progressively from the interior outwardly; and securing a plurality of said sheets together to form a block, substantially as described.

4. The process of producing waterproof heat insulating blocks of a thickness greater than one and a half inches which consists of felting wood pulp fibers into sheets less than one and a half inches in thickness; subjecting said fibers while wet to the action of a waterproofing material; drying said sheets progressively from the interior outwardly, whereby they become waterproofed; and binding a plurality of said sheets together to form a block of the desired thickness, substantially as described.

5. The process of producing an interlocking waterproof heat insulating block which consists in treating a mixture composed of less than one part of wood fibers and more than ninety nine parts of water with a water proofing substance; felting said fibers into sheets; reducing the moisture content of said sheets progressively from the interior outwardly to less than 5%; and securing together a plurality of said sheets with their edges offset to form interlocking joints, substantially as described.

6. The herein described new article of manufacture comprising a water proof heat insulating block composed of coarse fibers or slivers, to give porosity, of long hair like fibers to bind the mass, and of small short fibers to act as a filler, said block comprising a plurality of sheets having a total thickness greater than one and a half inches, and having its fibers felted together in each sheet, substantially as described.

7. The herein described new article of manufacture comprising a waterproof heat insulating block composed of coarse fibers, or slivers, to give porosity, of long hair like fibers to bind the mass, and of small short fibers to act as a filler, said block composed of a plurality of waterproof fiber sheets secured together with a binder, and said fibers being felted together in each sheet, substantially as described.

8. The herein described new article of manufacture comprising a waterproof heat insulating block composed of a plurality of waterproof fiber sheets, each sheet made from coarse fibers or slivers to give porosity to the mass, of long hair like fibers to act as a binder, and of short fibers to serve as a filler, and said sheets secured together with their edges offset to form interlocking joints and the fibers in each sheet felted together, substantially as described.

9. The herein described new article of manufacture comprising a waterproof heat insulating block having a thickness greater than one and a half inches composed of a plurality of waterproof fiber sheets each having a thickness less than one and half inches, and each sheet made from coarse fibers or slivers to give porosity to the mass, of long hair like fibers to act as a binder, and of short fibers to serve as a filler, and said sheets placed with their edges offset to form interlocking joints and secured with a binder, and the fibers in each sheet being felted into a single mass, substantially as described.

In testimony whereof I affix my signature.

TREADWAY B. MUNROE.